Oct. 7, 1930.  L. M. BEARLAND  1,777,907
SHOVEL ATTACHMENT FOR TRACTORS
Filed June 25, 1928  4 Sheets-Sheet 3
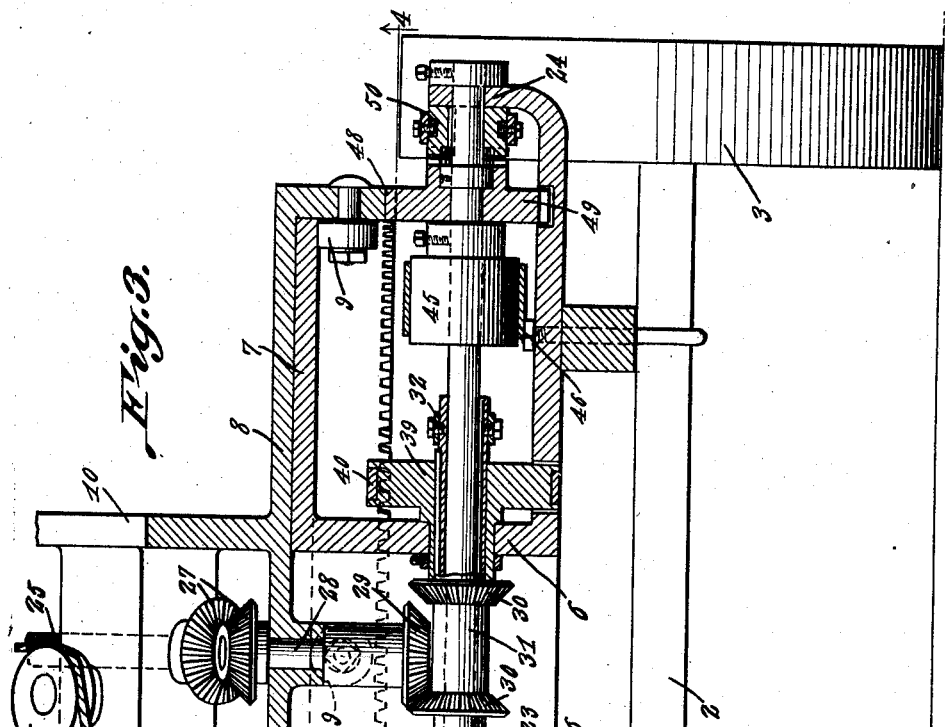

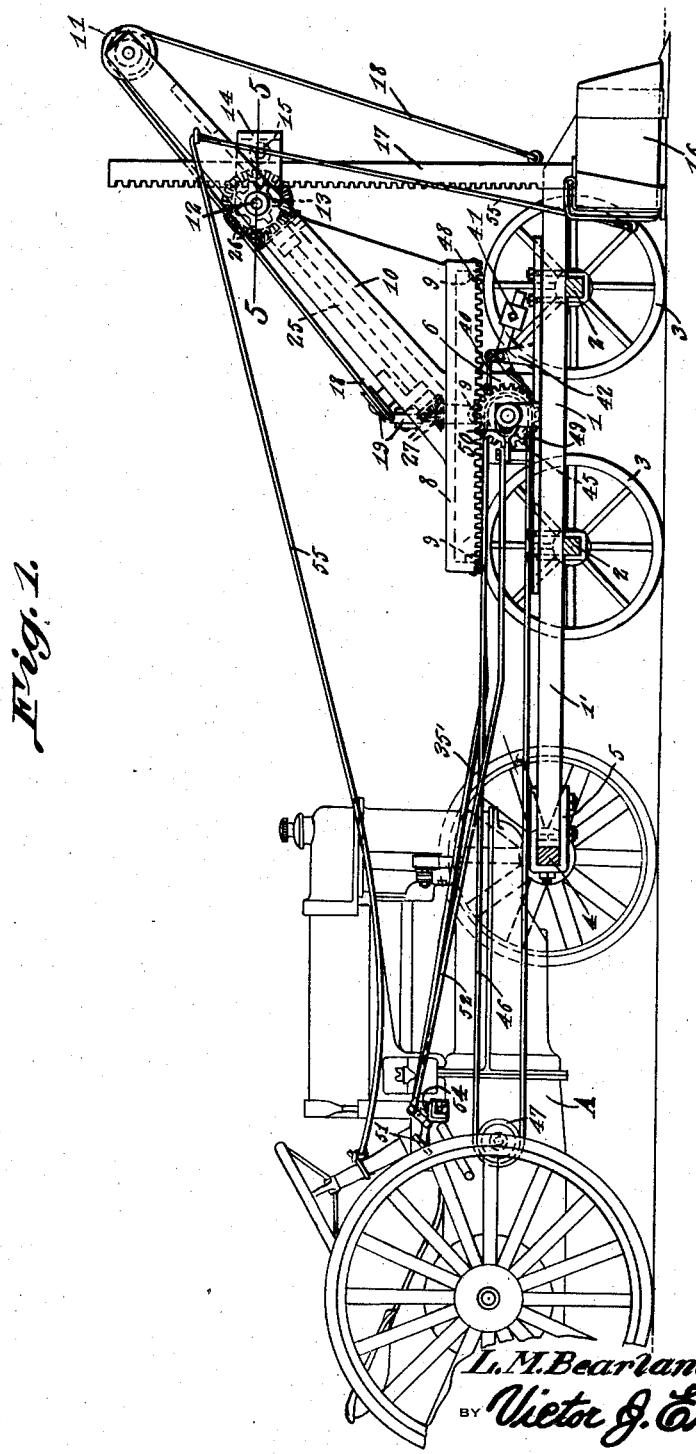

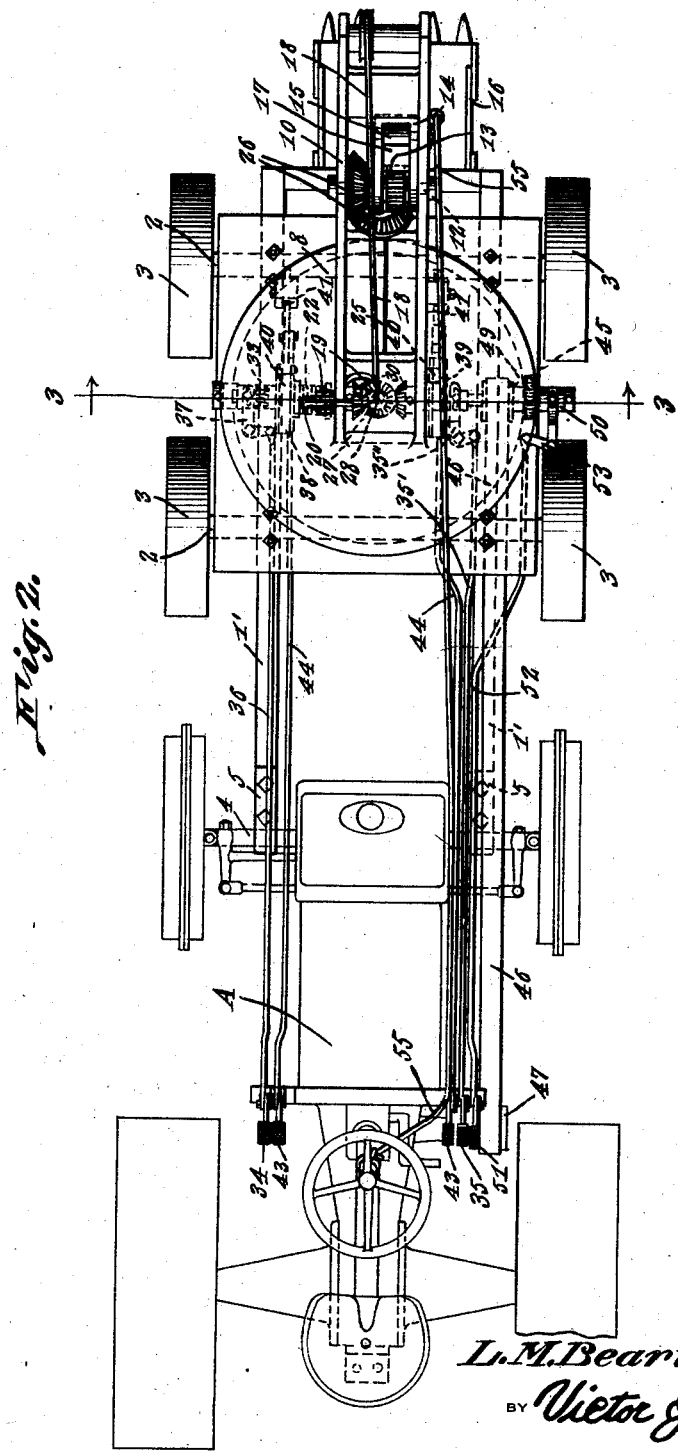

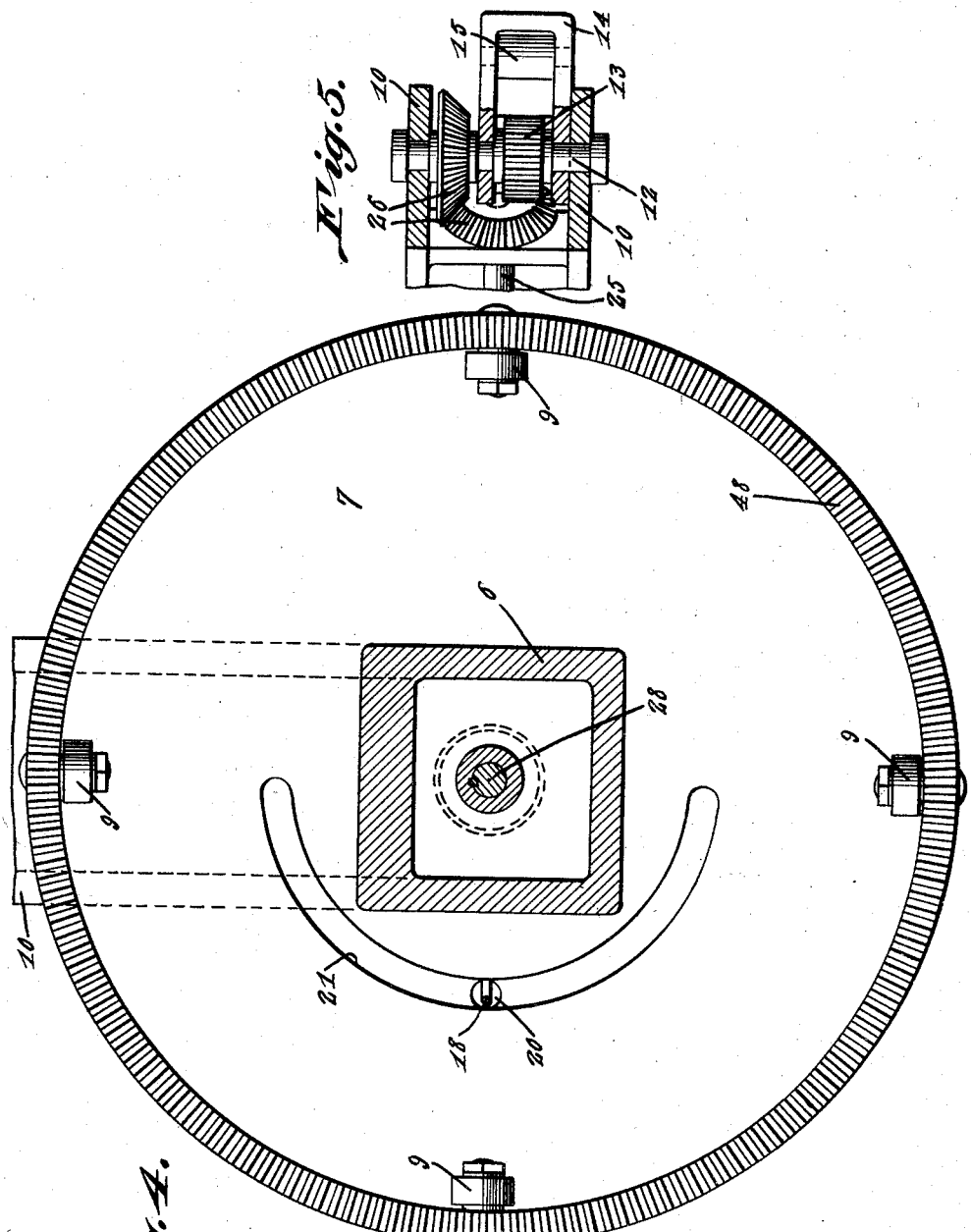

Patented Oct. 7, 1930

1,777,907

UNITED STATES PATENT OFFICE

LAWRENCE M. BEARLAND, OF MISSOULA, MONTANA

SHOVEL ATTACHMENT FOR TRACTORS

Application filed June 25, 1928. Serial No. 287,946.

This invention relates to a power shovel, the general object of the invention being to provide a wheeled truck for supporting the shovel and its associated parts, with means for propelling the truck and operating the shovel from a tractor.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the shovel and tractor.

Figure 2 is a plan view thereof.

Figure 3 is a section on line 3—3 of Figure 2.

Figure 4 is a section on line 4—4 of Figure 3.

Figure 5 is a section on line 5—5 of Figure 1.

In these views, the numeral 1 indicates the body of the truck which supports the shovel, this body being connected to the axles 2, each of which has a wheel 3 at each end thereof. The side bars of the body are extended rearwardly, as shown at 1', and are connected with the front axle 4 of the tractor A by the clamps 5. Thus the truck of the shovel is pushed by the tractor and said truck can be moved rearwardly by backing the tractor.

A tubular upright 6 is arranged at the center of the body 1 and a horizontal circular member 7 has its center connected with the upper end of the upright 6. A flanged platform 8 of circular formation rests on the member 7 with its flanges fitting over the periphery of said member and depending below the same. Rollers 9 are connected with the flanges and engage the lower face of the member 7. An upwardly and forwardly extending frame 10 has its lower end connected with the central part of the platform and carries a sheave 11 at its upper end and intermediate the ends of the frame, a shaft 12 is journaled therein which carries a toothed wheel 13 and a yoke 14 is pivoted to the shaft and straddles the wheel 13. This yoke has rotatably supported therein a roller 15.

The shovel is shown at 16 and a rack bar 17 has its lower end connected with the shovel, the rack bar passing through the yoke between the wheel 13 and the roller 15 with its teeth engaging the teeth of the wheel 13 so that by rotating the shaft, the rack bar with the shovel is raised and lowered. A cable 18 has one end connected with the lower end of the rack bar and passes over the sheave 11 and over the sheaves 19 arranged at the lower part of the frame 10, through a hole 20 in the platform and through a semi-circular slot 21 in the member 7 to a drum 22 rotatably arranged on a shaft 23 journaled in the uprights 24 and the member 6 of the body 1 and arranged transversely at the center of the body.

A longitudinally extending shaft 25 is journaled in the lower part of the frame 10 and has its upper end connected with the shaft 12 by the beveled gears 26 and its lower end is connected by the beveled gears 27 with a vertically arranged shaft 28 journaled in the central part of the platform 8 and having a beveled gear 29 at its lower end which is adapted to mesh with either one of the beveled gears 30 arranged on a hollow shaft 31 slidably but non-rotatably mounted on the shaft 23 and having a portion passing through the tubular part 6 with the gears 30 arranged within said tubular part. A grooved collar 32 is arranged on the hollow shaft 31 for sliding said shaft on the shaft 23, and a clutch 33 is provided for connecting the drum with the shaft and disconnecting it from the shaft, the clutch 33 being operated from the pedal 34 arranged on the tractor through the rod 36 and the bell crank 37 which is connected with the clutch collar of the clutch 33. A pedal 35 is connected with the collar 32 by a rod 35' and its bell crank 35''.

The drum 22 is provided with a brake drum 38 and the hollow shaft 31 is provided with a brake drum 39, the brake bands 40 of these drums being normally held contracted by the weighted bell cranks 41 which are pivotally supported from the uprights 42 on the body 1 and connected with the bands. These bell cranks are adapted to be moved to raised position to expand the bands through means of the pedals 43 arranged on the tractor and connected with the bell cranks by the rods 44. A pulley 45 is keyed to the shaft 23 and a belt 46 passes over this pulley and over the pulley 47 of the tractor. Thus the shaft 23 is rotated from the pulley of the tractor.

The bottom of the flange of the platform 8 is provided with the teeth 48 which are engaged by the gear 49 rotatably arranged on the shaft 23 and a clutch 50 is adapted to connect the gear 49 with the shaft and disconnect it therefrom. This clutch 50 is operated from the pedal 51 on the tractor by means of the rod 52 and the bell crank 53 which is connected with the collar of the clutch. Each pedal is provided with a spring 54 for normally holding the pedal with the parts attached thereto in inoperative position.

A cable 55 is connected with the rear part of the shovel 16 and passes over a guiding part on the frame 10 and is connected with the steering column of the tractor so that it can be easily grasped by the driver of the tractor and pulled upon to dump the shovel.

From the foregoing it will be seen that the shaft 23 is driven from the pulley of the tractor and that the drum 22, the shaft 31 and the gear 49 are normally disengaged from the shaft 23, the drum 22 and the shaft 31 being normally held stationary by their brakes. Thus when it is desired to turn the platform or turntable 8 to place the shovel in the desired position, the pedal 51 is depressed to shift the clutch 50 into engagement with the gear 49 so that said gear will be connected with the shaft 23 and thus the platform will be partly rotated to position the shovel. Then the pedal is released so as to disconnect the gear 49 from the shaft 23. When the shovel is to be raised, both of the pedals 34 and 43 are depressed, these pedals being placed close together so that one foot of the operator can depress both pedals and the depression of these pedals will release the brake of the drum 22 and at the same time move the clutch 33 into operative position so that the cable 18 will be wound upon the drum, thus swinging the shovel upwardly and outwardly and at the same time the pedals 35 and 43 on the right hand side of the tractor are depressed to release the brake from the drum 39 on the shaft 31 and at the same time to shift the shaft so as to place one of the gears 30 thereon in mesh with the gear 39 to cause the operation of the rack gear 13, which will move the bar 17 and the shovel upwardly at the same time the bar and shovel are swung outwardly by the cable 18. This action will fill the shovel and then by releasing the brake pedals, the parts will be held with the shovel raised and then the platform can be moved to position the shovel over a wagon or the like. Then the cable 55 is pulled to dump the shovel.

Of course, means must be provided whereby the pedal 35, when in fully raised position, will hold the shaft 31 with the gears 30 out of mesh with the gear 29 and then, when the pedal is partly depressed, one gear 31 will be moved into mesh with the gear 29 and when the pedal is fully depressed, the opposite gear 31 will be moved into mesh with the gear 29. A hand lever can be substituted for this pedal, if desired.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:—

A power shovel comprising a frame having an upright of tubular construction thereon, a disk connected with the upper end of the upright, a flanged turntable on the disk, with its flange extending downwardly over the edge of the disk, rollers on the flange engaging the under face of the disk, the lower edge of the flange being toothed, a power shaft journaled in the frame and passing through the tubular part, a gear loosely mounted on the shaft and meshing with the teeth on the flange, clutch means for connecting the gear with the shaft, a beam carried by the turntable, a rack bar, a shovel at the lower end of the rack bar, guiding means on the beam for the bar, a shaft carried by the beam, a toothed wheel on said shaft engaging the rack bar, a longitudinally extending shaft carried by the beam, gears connecting the upper end of the shaft with the shaft carrying the toothed wheel, a vertically arranged stub shaft journaled in the platform, gears connecting the upper end of said stub shaft with the lower end of the longitudinal shaft, a hollow shaft slidably and non-rotatably arranged on the power shaft, a pair of beveled gears on said hollow shaft, a beveled gear on the lower end of the stub shaft for meshing with either one of said pair of gears, manually operated means for moving the hollow shaft to space the beveled gears thereon from the beveled gear on the stub shaft or to place either gear on the hollow shaft in mesh with the gear on the stub shaft, a drum loosely arranged on the drive shaft, a cable connected with the drum and with the shovel and clutch means for connecting the drum with the drive shaft.

In testimony whereof I affix my signature.

LAWRENCE M. BEARLAND.